US006729440B1

(12) United States Patent
Bailey

(10) Patent No.: US 6,729,440 B1
(45) Date of Patent: May 4, 2004

(54) ADJUSTABLE LADDER

(76) Inventor: Robert Bailey, 23867 Corte Emerado, Murrieta, CA (US) 92562

( * ) Notice: Subject to any disclaimer, the term of this patent is extended or adjusted under 35 U.S.C. 154(b) by 0 days.

(21) Appl. No.: 10/247,040

(22) Filed: Sep. 18, 2002

Related U.S. Application Data

(60) Provisional application No. 60/326,617, filed on Oct. 3, 2001.

(51) Int. Cl.[7] ............................ E06C 1/00; F16M 11/26
(52) U.S. Cl. ..................... 182/204; 182/200; 248/188.5
(58) Field of Search ................................ 182/200, 201, 182/202, 203, 204; 248/188.1, 188.6

(56) References Cited

U.S. PATENT DOCUMENTS

| | | | | | |
|---|---|---|---|---|---|
| 2,936,849 | A | | 5/1960 | Larson | 182/204 |
| 3,861,500 | A | * | 1/1975 | Dempsey | 182/204 |
| 3,948,352 | A | * | 4/1976 | Larson et al. | 182/204 |
| 4,091,893 | A | | 5/1978 | Neal | |
| 5,497,850 | A | | 3/1996 | Patterson | 182/204 |
| 5,853,065 | A | * | 12/1998 | Hutson et al. | 182/204 |
| 6,073,726 | A | * | 6/2000 | McCrystal | 182/204 |

* cited by examiner

*Primary Examiner*—Hugh B. Thompson, II
(74) *Attorney, Agent, or Firm*—Matthew J. Peirce

(57) ABSTRACT

A ladder that would have a plurality of legs that would be independently adjustable from each other is disclosed. Each leg would have an incorporated adjustable leg that could be set at a varying height, with each adjustable leg having a non-skid pad on the bottom to minimize the risk that the ladder would slip when in use.

1 Claim, 1 Drawing Sheet

ADJUSTABLE LADDER

This application claims the benefit of Provisional application Ser. No. 60/326,617, filed Oct. 3, 2001.

I. BACKGROUND OF THE INVENTION

The present invention concerns that of a new and improved ladder which would have a pair of legs that could be independently adjustable from each other.

II. DESCRIPTION OF THE PRIOR ART

U.S. Pat. No. 5,497,850, issued to Patterson, discloses an apparatus for leveling a ladder on uneven surfaces comprised of legs for fitting into the hollow side rails that are fastened through support holes using bolts.

U.S. Pat. No. 4,091,893, issued to Neal, discloses a ladder with adjustable legs for use on uneven surfaces.

U.S. Pat. No. 2,936,849, issued to Larson, discloses a ladder with adjustable legs for use on uneven surfaces.

III. SUMMARY OF THE INVENTION

The present invention concerns that of a new and improved ladder that would have a plurality of legs that would be independently adjustable from each other. Each leg would have an incorporated adjustable leg that could be set at a varying height, with each adjustable leg having a non-skid pad on the bottom to minimize the risk that the ladder would slip when in use.

There has thus been outlined, rather broadly, the more important features of a ladder that the detailed description thereof that follows may be better understood and in order that the present contribution to the art may be better appreciated. There are, of course, additional features of the ladder that will be described hereinafter and which will form the subject matter of the claims appended hereto.

In this respect, before explaining at least one embodiment of the ladder in detail, it is to be understood that the ladder is not limited in its application to the details of construction and to the arrangements of the components set forth in the following description or illustrated in the drawings. The ladder is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present ladder. It is important, therefore, that the claims be regarded as including such equivalent constructions insofar as they do not depart from the spirit and scope of the present invention.

It is therefore an object of the present invention to provide a ladder which has all of the advantages of the prior art and none of the disadvantages.

It is another object of the present invention to provide a ladder which may be easily and efficiently manufactured and marketed.

It is another object of the present invention to provide a ladder which is of durable and reliable construction.

It is yet another object of the present invention to provide a ladder which is economically affordable and available for relevant market segment of the purchasing public.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Priority is hereby claimed to application 60/326,617, filed on Oct. 3, 2001.

Figure 1:
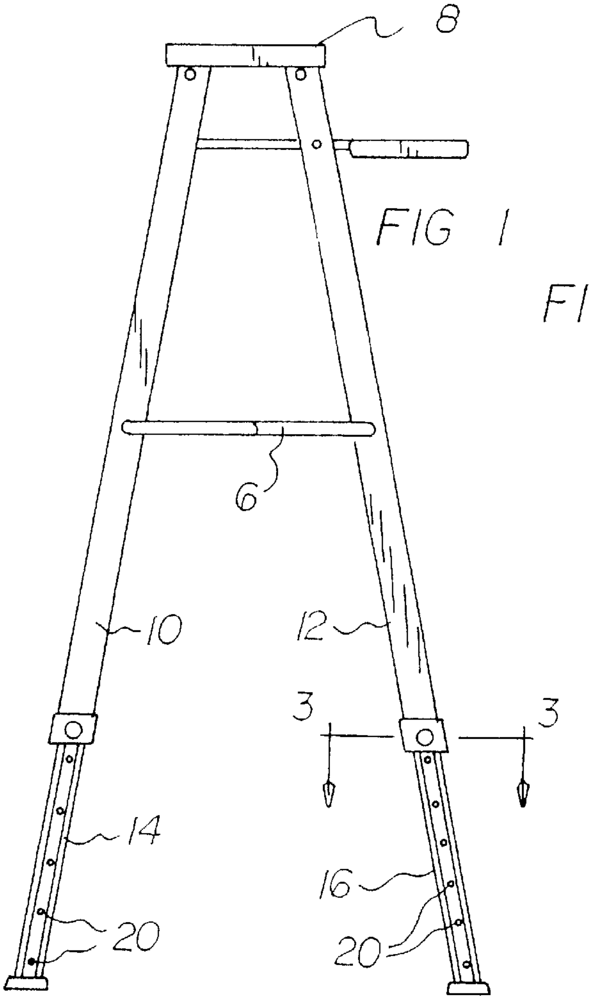
FIG. 1 shows a side view of the present invention.
Figure 2:
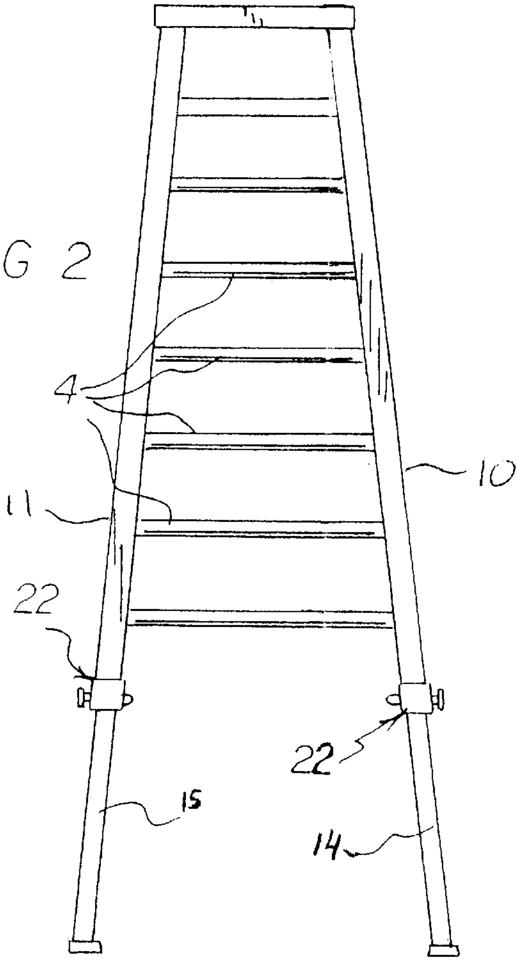
FIG. 2 shows a front view of the present invention.

FIGS. 1 and 2 show side and front views, respectively, of the present invention. Ladder 2 include a plurality of rungs 4, a middle support bar 6, a top seat 8, and a quartet of legs 10, 11, 12, and 13. Top seat 8 has two surfaces, a top surface and a bottom surface, two ends, a first end and a second end, and two sides, a first side and a second side. Leg 10 and leg 11 would be attached to the bottom surface of the top seat 8 near the first side of the top seat 8, while leg 12 and leg 13 (not shown) would be attached to the bottom surface of the top seat 8 near the second side of the top seat 8.

Each rung of the plurality of rungs 4 would have two ends, a first end and a second end. The first end of each rung would be attached to leg 10, while the second end of each rung would be attached to leg 11. Each rung of the plurality of rungs 4 is parallel to one another, with the rungs being evenly spaced out from one another.

The middle support bar 6 has two ends, a first end and a second end. The first end of the middle support bar 6 is attached to the leg 10, while the second end of the middle support bar 6 is attached to the leg 12.

Ladder 2 also includes a quartet of adjustable legs 14, 15, 16, and 17, with each of the adjustable legs having bottom-mounted pads 18 which are non-skid surfaces. Each adjustable leg would be slideaby inserted within the bottom end of a leg of the ladder 2. Adjustable leg 14 would be slideaby inserted within the bottom end of leg 10 of the ladder 2. Adjustable leg 15 would be slideaby inserted within the bottom end of leg 11 of the ladder 2. Adjustable leg 16 would be slideaby inserted within the bottom end of leg 12 of the ladder 2. Adjustable leg 17 would be slideaby inserted within the bottom end of leg 13 of the ladder 2.

Each adjustable leg has a plurality of side-mounted adjustment holes 20 which would be approximately two inches apart. In addition, each of the legs 10 through 13 would each have a lock mechanism 22 which would allow each lock mechanism 22 to lock into a particular adjustment hole 20. Each lock mechanism 22 works independently of each other and would allow each adjustable leg to be locked in to different heights, if that is what a user would desire.

Figure 3:
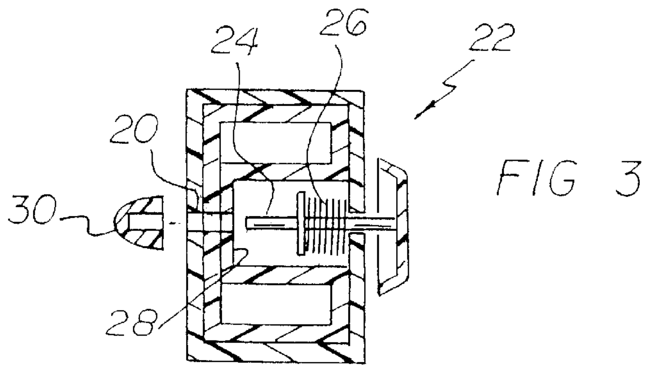
FIG. 3 shows a side view of the locking mechanism used with the present invention.

FIG. 3 shows a side view of the locking mechanism 22 used with the present invention. Pin 24 would have a coiled spring 26 wrapped around it and would normally be inserted through casing 28 into and through a particular adjustment hole 20. In order to remove pin 24 from a particular adjustment hole 20, a user would have to pull out pin 24. Once pin 24 would be removed from a particular adjustment hole 20 and a user would let go of pin 24, the tension provided in coiled spring 26 would pull pin 24 back into casing 28.

When pin 24 would be inserted into an adjustment hole 20, pin 24 would travel all the way through the adjustable leg and exit on the inner side of the adjustable leg. Then, a user could cap off the tip of pin 24 with plastic insert 30, which would make it quite difficult for pin 24 to dislodge from an adjustment hole 20 while in use.

What I claim as my invention is:

1. A ladder comprising:

(a) a top seat having two surfaces, a top surface and a bottom surface, the top seat further having two ends, a first end and a second end, and the top seat further having two sides, a first side and a second side, (b) a first pair of legs comprising a first leg and a second leg, each leg having two ends, a top end and a bottom end, the top end of each leg of the first pair of legs being attached to the bottom surface of the top seat near the first side of the top seat, the bottom end of each leg of the first pair of legs being open, (c) a second pair of legs comprising a first leg and a second leg, each leg having two ends, a top end and a bottom end, the top end of each leg of the second pair of legs being attached to the bottom surface of the top seat near the second side of the top seat, the bottom end of each leg of the second pair of legs being open, (d) a plurality of rungs, each rung having two ends comprising a first end and a second end, the first end of each rung attached to the first leg of the first pair of legs, the second end of each rung attached to the second leg of the first pair of legs, each rung of the plurality of rungs being parallel to one another, the rungs being evenly spaced out from one another, (e) a middle support bar having two ends, a first end and a second end, the first end of the middle support bar being attached to the first leg of the first pair of legs, the second end of the middle support bar being attached to the first leg of the second pair of legs, (f) a quartet of adjustable legs, each adjustable leg having two ends, a top end and a bottom end, each adjustable leg being slidably insertable into the bottom end of a leg of the ladder, (g) means for locking each adjustable leg at a predetermined height, wherein the means for locking each adjustable leg at a predetermined height further comprises (i) a plurality of adjustment holes evenly spaced out along each adjustable leg, each hole being approximately two inches from adjacent holes, (ii) a locking mechanism attached to the bottom end of each leg of the first pair of legs and the second pair of legs, and (iii) wherein each locking mechanism is used to set the corresponding adjustable leg to a specific length, further wherein the locking mechanism attached to the bottom end of each leg of the first pair of legs and the second pair of legs further comprises (i) an outer casing, (ii) a pin inserted through the casing and through a particular adjustment hole, (iii) a coiled spring wrapped around the pin, (iv) wherein a user would pull the pin outward to move an adjustable leg up or down, and further wherein a user would stop pulling the pin outward to set the adjustable leg at a specific height, allowing the coiled spring wrapped around the pin to force the pin into an adjustment hole.

* * * * *